United States Patent
Panteleenko et al.

(10) Patent No.: US 9,189,502 B2
(45) Date of Patent: Nov. 17, 2015

(54) TECHNIQUES FOR MOVING DATA FILES WITHOUT INTERRUPTING ACCESS

(71) Applicant: Oracle International Corporation, Redwood Shores, CA (US)

(72) Inventors: Vsevolod Panteleenko, San Mateo, CA (US); Yunrui Li, Fremont, CA (US); Jonghyun Lee, Sunnyvale, CA (US); Margaret M. Susairaj, Sunnyvale, CA (US); William H. Bridge, Jr., Alameda, CA (US); Vinay Srihari, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 78 days.

(21) Appl. No.: 13/630,582

(22) Filed: Sep. 28, 2012

(65) Prior Publication Data

US 2014/0095553 A1  Apr. 3, 2014

(51) Int. Cl.
*G06F 17/30* (2006.01)

(52) U.S. Cl.
CPC ................... *G06F 17/303* (2013.01)

(58) Field of Classification Search
USPC .............................. 707/2, 3, 661, 8
See application file for complete search history.

(56) References Cited

U.S. PATENT DOCUMENTS

| | | | |
|---|---|---|---|
| 6,178,428 B1 * | 1/2001 | Pystynen et al. ................ | 1/1 |
| 6,366,928 B1 * | 4/2002 | Davy ................................ | 1/1 |
| 2003/0229609 A1 * | 12/2003 | Haugh ........................... | 707/1 |
| 2005/0108232 A1 * | 5/2005 | Rockey ........................... | 707/8 |
| 2005/0182774 A1 * | 8/2005 | Weir et al. .................... | 707/100 |
| 2009/0319532 A1 * | 12/2009 | Akelbein et al. ............. | 707/10 |
| 2013/0173686 A1 * | 7/2013 | Hu et al. ..................... | 709/202 |

* cited by examiner

*Primary Examiner* — Etienne Leroux
(74) *Attorney, Agent, or Firm* — Hickman Palermo Becker Bingham LLP

(57) ABSTRACT

Techniques for moving data files without interrupting access are described. A first process moves a database file from a first location to a second location while the database file is accessible to one or more other processes for read or write operations. According to one technique, the first process communicates a move status and a copy range into the database file to one or more database server instances executing the one or more other processes. The one or more other processes then perform input/output (IO) operations on the database file based at least in part on the move status and the copy range communicated by the first process.

20 Claims, 6 Drawing Sheets

FIG. 3

| | Conditions 300 | Actions 301 |
|---|---|---|
| Transition 205 | Determine that the data file is to be moved | Update control file to the COPYING state, Communicate COPYING state and an initial copy range to the database server instances |
| Transition 206 | Determine that copying of the data file is not yet complete | Advance copy range, Communicate the new copy range to the database server instances, Copy all data blocks in the new copy range to the new location |
| Transition 207 | Determine that data file has been successfully copied | Update control file to SUCCESS state, Communicate SUCCESS state to the database server instances, Commit the move |
| Transition 208 | Determine that SUCCESS state has been communicated to the database server instances | Update control file to DONE state, Communicate DONE state to the database server instances, Perform cleanup operations |
| Transition 209 | Determine that cleanup operations have been completed | Update control file to NORMAL state |
| Transition 210 | Determine that a failure has occurred while copying the data file | Update control file to FAILURE state, Communicate FAILURE state to the database server instances, Delete data file at new location |
| Transition 211 | Determine that data file at new location has been deleted and FAILURE state has been communicated to the database server instances | Update control file to NORMAL state |

FIG. 5

| | Conditions 500 | Actions 501 |
|---|---|---|
| Transition 403 | Receive COPYING state and an initial copy range from the moving process | Update local move status to COPYING state, Store initial copy range in local memory |
| Transition 404 | Receive a new copy range from the moving process | Update copy ranged stored in local memory to the new copy range |
| Transition 405 | Receive SUCCESS state from the moving process | Update local move status to SUCCESS state |
| Transition 406 | Receive DONE state from the moving process | Update local move status to NORMAL state |
| Transition 407 | Receive FAILURE state from the moving process | Update local move status to NORMAL state |

TECHNIQUES FOR MOVING DATA FILES WITHOUT INTERRUPTING ACCESS

FIELD OF THE INVENTION

The techniques presented herein are directed towards moving data files while allowing concurrent read and write access.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database Systems

A database server manages a database. A database comprises database data and metadata that is stored on a persistent memory mechanism, such as a set of hard disks. In a database, data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. However, other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field respectively.

Database applications and clients interact, directly or indirectly, with the database by submitting database commands that cause the database server to perform operations on the data stored within the database. A database command may be in the form of a database statement that conforms to a database language, such as Structured Query Language (SQL). However, although the example described above is based on SQL, the techniques provided herein are not limited to any particular form of database command or database language.

In most cases, a database server executes database commands as one or more transactions, sets of indivisible operations performed on a database. Thus, after executing a given transaction, the database is left in a state where all the transaction's operations have been performed or none of the transaction's operations have been performed. While implementations may differ, most transactions are performed by, 1) beginning the transaction, 2) executing one or more data manipulations or queries, 3) committing the transaction if no errors occurred during execution, and 4) rolling back the transaction if errors occurred during execution. Consequently, a database server may maintain logs keeping track of committed and/or uncommitted changes to the database. For example, in some implementations of SQL, executing database commands adds records to REDO and UNDO logs, which can be used to implement rollback, database recovery mechanisms, and features such as flashback queries.

A multi-node database system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing one or more particular functions on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database server instances, some or all of which are running on separate computers.

Moving Data Files

Many database systems operate in an environment where multiple processes concurrently manage the database's data. For example, in a single host configuration, a database server instance may execute multiple processes that each performs input/output (IO) operations on the database. As another example, in a clustered environment, multiple database server instances, each of which executing one or more processes, concurrently manage the database as shared storage.

In some databases, the data is represented as a set of database files comprising data blocks of a fixed sized that are read and written (potentially multiple blocks at a time) as a single unit of access. However, concurrent access to a data block by multiple processes can lead to data consistency issues, such as block corruption. As one example of block corruption, concurrent reads and writes to a data block can lead to fractured blocks, where part of the block contains an updated version of the data and the other part contains an older version of the data. In order to prevent such corruptions, database systems frequently employ techniques that prevent operations issued by different processes from conflicting.

Customers invariably need to move their storage for data files from one location to another. For example, customers may move data when upgrading older disks to newer disks with superior performance and/or storage capabilities. As another example, customers may move less frequently accessed data to slower disks in order to make room on faster disks for more frequently accessed data. However, due to the data consistency issues mentioned above, database systems will often bring the database files and/or the database server instances offline to prevent concurrent access to the files while the move is being performed. For example, the database server instances may be brought offline while the files are moved using conventional Operating System tools. For large databases, the move operation can take a long time, during which the database files being moved or the whole database becomes unavailable.

BRIEF DESCRIPTION OF THE DRAWINGS

The present invention is illustrated by way of example, and not by way of limitation, in the figures of the accompanied drawings and in which like reference numerals refer to similar elements and in which:

FIG. 3 is a table illustrating the transitions between the states depicted by the state diagram of FIG. 2.

FIG. 5 is a table illustrating the transitions between the states depicted by the state diagram of FIG. 4.

DETAILED DESCRIPTION

Figure 1:
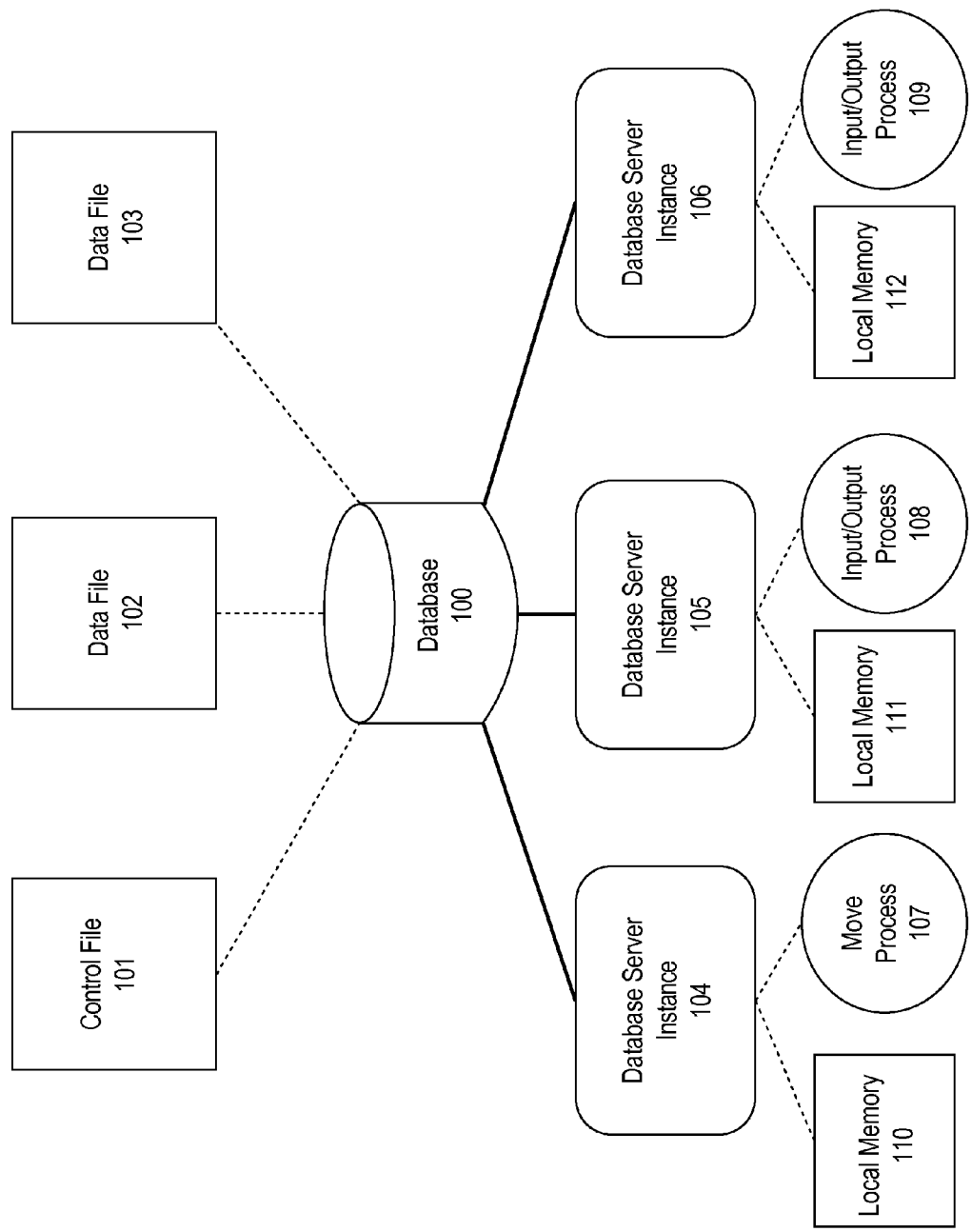
FIG. 1 is a block diagram illustrating an example operating environment upon which an embodiment of the present invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Operating Environment
3.0 Moving Process Flow
4.0 Database Server Instance Flow
5.0 IO Processes
6.0 New Database Server Instance Joining the Cluster
7.0 Error Handling Hardware Overview 1.0 General Overview As mentioned above, when a file is moved from one location to another location within a database, the file is often brought offline or otherwise rendered inaccessible through techniques such as locking. As a result, all processes but the process actually moving the file becomes unable to complete IO operations on the file until the move is complete. For example, the moving process may lock the file or bring the file offline, copy each data block of the file to the new location, delete the old version of the file, and then unlock the file or bring the file back online. However, especially for large files, the aforementioned techniques may render the file unavailable for a significant period of time.

In some embodiments of the present invention, instead of making the file completely unavailable, the moving process (move process) performs the move in stages and communicates the progress of the move to database server instances executing processes (IO processes) that perform reads and writes on the file while the move is ongoing. In one embodiment, the move process progresses through the move by transitioning between five states, the normal state, the copying state, the success state, the done state, and the failure state. Thus, when transitioning between states, the move process communicates the progress of the move (represented by the current state) to the database server instances.

The normal state indicates that the file is not currently being moved to a new location. As a result, the IO processes issue reads and writes to the file normally. Once the move process has determined that the data file should be moved to a new location, the move transitions to the copying state.

The copying state indicates that the data blocks of the file are currently in the process of being copied to the new location. However, instead of rendering the file inaccessible while all the data blocks are copied, the move process copies the data blocks in batches, where a particular range of data blocks is copied in each batch. As a result, when an IO process writes to a block, the performance of the write depends upon the range of data blocks currently being copied. If the data block has not yet been copied (above the copy range), the IO process writes to the file at the old location. Since the move process will eventually advance the copy range to cover that data block, the write will be propagated to the new location by the time copying completes. If the data block is currently in the range being copied, the IO process waits until the moving process advances the copy range beyond the data block, and then issues the write. If the data block has already been copied (below the copy range), the IO process writes to the file at both the old and new locations. Thus, should another IO process read the file; the result of the read will be consistent regardless of the location to which the read was issued. As a result, at any given time during the copying of the file's data blocks, only a subset of the file's data blocks are unavailable for writes at a given time, rather than the file as a whole and the whole file is available for reads. If the data file is successfully copied to the new location, the move transitions to the success state. However, if the data file is not successfully copied the move transitions to the failure state.

The success state indicates that the copying of the file's data blocks to the new location has completed successfully and the move process has therefore committed the move. However, even though the move has been committed, there may still be database server instances that are not yet aware of that fact. Consequently, the IO processes being executed by those database server instances may still perform reads to the file at the old location. As a result, during this stage of the move, IO processes write to the file at both the old and new locations to ensure read consistency. Once all the database server instances have been informed that the file has been successfully copied, the move transitions to the done state.

The done state indicates that all of the database server instances are aware that the file has been successfully copied. As a result, the IO processes issue subsequent IO operations to the data file at the new location, which becomes the primary location of the file. During this state, the move process cleans up the move by deleting the old version of the file and thus the move transitions back to the normal state.

The failure state indicates that an error has occurred while copying the file's data blocks to the new location. As a result, the move process rolls the move back, thus removing the data file at the new location. Consequently, the IO processes once again issue IO operations to the data file normally and the move transitions back to the normal state.

2.0 Operating Environment

FIG. 1 is a block diagram illustrating an example operating environment upon which an embodiment of the present invention may be implemented. In FIG. 1, database 100 is communicatively coupled to database server instances 104, 105 106 and stores database elements in one or more files, including data files 102, 103, and maintains metadata related to the data files 102, 103 in control file 101. Each of the database server instances 104, 105, 106 is communicatively coupled to a respective local memory 110, 111, 112 and executes one or more respective processes including move process 107, and IO processes 108, 109. Although FIG. 1 depicts only a particular number of each type of element, FIG. 1 is intended only as an illustrative example to facilitate explanation of the techniques described herein. A practical environment may have many more, perhaps hundreds or thousands, of each of the elements depicted within FIG. 1. Furthermore, the depiction of FIG. 1 illustrates a clustered environment where multiple database server instances 104, 105, 106 perform operations concurrently on database 100. Thus, the examples contained herein will be described primarily in reference to a clustered environment. However, in other embodiments, the techniques described herein may be implemented using a single-host environment that contains only a single database server instance executing one or more processes that interact with database 100, such as move process 107 and IO process 108, 109.

In some embodiments, although database 100 is depicted as a single entity within FIG. 1, database 100 may be distributed across many different storage devices located at potentially many different physical locations.

In an embodiment, database 100 stores one or more files, including control file 101, and data files 102, 103, which comprise data blocks that are read and written as a single unit of access by database server instances 104, 105, 106. In some embodiments, the data blocks of control file 101, and data files 102, 103 are a fixed size. However, in other embodiments, the data blocks of control file 101, and data files 102, 103 may be variable sizes.

In an embodiment, control file 101 contains metadata that indicates the location and status of database 100's data files, including data files 102, 103. For example, data files 102, 103 may each be referenced by a unique identifier that the control file 101 maps to the specific storage device and/or memory location where the respective data file can be located. Thus, when the database server instances 104, 105, 106 perform IO operations on data files 102, 103, the database server instances 104, 105, 106 perform an initial lookup into control file 101 to determine the location of the respective data file. Then, once the respective data file's location within database 100 has been determined, the database server instances 104, 105, 106 perform the IO operation on the data blocks of the respective data file at that location. Furthermore, in some embodiments, control file 101 maintains a status for data files 102, 103 indicating whether each respective data file is in the process of being moved and/or an indication of the move's progress.

In an embodiment, data files 102, 103 contain data and/or metadata related to database elements of database 100, such as indexes, tables, views, stored procedures, statistics, etc. In some cases, data files 102 and 103 each correspond to a particular database element. For example, data file 102 may contain data blocks for the rows of a particular table and data file 103 may contain data blocks for an index into that table. However, in other embodiments, data files 102 and 103 may each contain data blocks for multiple database elements.

In an embodiment, database server instances 104, 105, 106 each represent one or more software components executing on a host computing device, such as the computing device described below in the "Hardware Overview". In some embodiments, database server instances 104, 105, 106 are configured to accept user commands, such as such as Data Definition Language (DDL) and Data Manipulation Language (DML) instructions and carry out those commands on database 100. Consequently, database server instances 104, 105, 106 execute one or more processes, represented by move process 107 and IO processes 108, 109 respectively, that perform operations on database 100. In one embodiment, the computing devices executing database server instances 104, 105, 106 are communicatively coupled to database 100 by a physical connection such as a computer bus or Ethernet cable. However, in other embodiments, the computing devices executing database server instances 104, 105, 106 are communicatively coupled to database 100 over one or more local or wide area networks. In one embodiment, the computing devices executing database server instances 104, 105, 106 are communicatively coupled to database 100 over the Internet. In other embodiments, rather than being executed by different computing devices, database server instances 104, 105, 106 may be executed by the same computing device or distributed across any number of computing devices.

In an embodiment, move process 107 is the process responsible for moving data files, such as data files 102, 103 to new locations. IO processes 108, 109 are processes that perform IO operations for their respective database server instances 105, 106. However, in some embodiments, move process 107 may also perform IO operations for database server instance 104 in addition to performing the move. Alternatively, database server instance 104 may execute one or more separate processes for the purpose of carrying out general IO operations.

Local memory 110, 111, 112 contains local data belonging to database server instance 104, 105, 106 respectively. In an embodiment, local memory 110, 111, 112 stores a move status for data files 102, 103 representing each database instance's current knowledge of whether the data files 102, 103 are being moved by move process 107 and/or the current progress of the move. In some embodiments, local memory 110, 111, 112 represent a shared storage area for the processes executed by each respective database server instance 104, 105, 106.

3.0 Move Process Flow

For the following explanations it will be assumed that move process 107 moves data file 102 from a first location (referred to as the "old" location) to a second location (referred to as the "new" location). In some embodiments, the new location and the old location are different memory locations within the same storage device. However, in other embodiments, the new location and the old location may be located on different storage devices.

Figure 2:
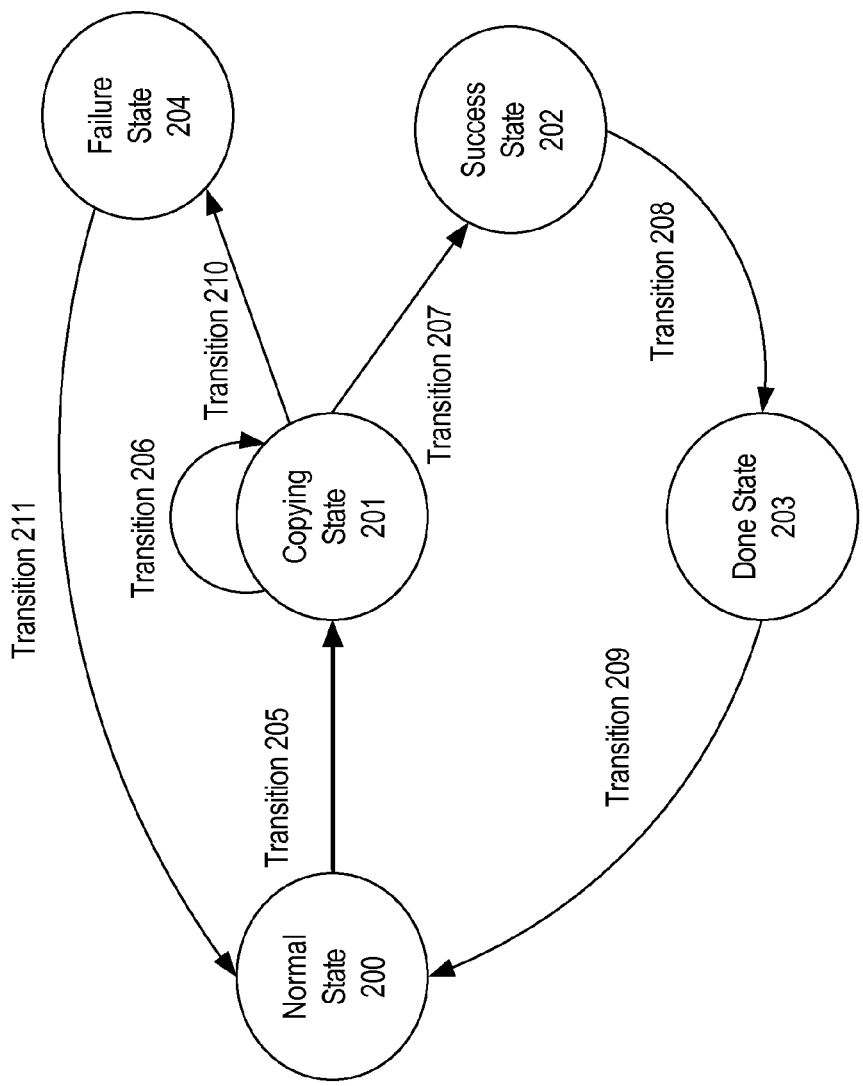
FIG. 2 is a state diagram illustrating the flow of a move process according to an embodiment of the present invention.

FIG. 2 illustrates a state diagram for move process 107 according to an embodiment of the present invention. The states of FIG. 2 are represented by circles and the transitions between the states are represented by arrows. A transition for the purpose of this section is defined by the condition for performing the transition and the actions (also referred to as steps) performed while transitioning from one state to another. In some embodiments, move process 107 may transfer more than one file at a time and the move for each file may be performed asynchronously. As a result, move process 107 may follow the state diagram of FIG. 2 separately for each file being transferred. FIG. 3 illustrates a table that describes the conditions 300 and actions 301 associated with each of the transitions of FIG. 2. Since FIG. 2 is a representative example of the flow of move process 107 according to one embodiment, the order that the actions are listed in FIG. 3 is not dispositive. In some embodiments, the actions 301 may be performed in a different order. In addition, depending on the embodiment, the performance of the actions 301 may take place before the transition, during the transition, or after the transition. Furthermore, some embodiments may include less states or more states than is depicted in FIG. 2 and the actions 301 performed during the corresponding transitions may be condensed or expanded across a fewer or greater number of transitions (potentially with one or more new actions being added and/or one or more depicted actions being omitted).

In addition, it will be assumed that control file 101 stores a move status for data file 102 that tracks the progress of move process 107 as the state diagram of FIG. 2 is traversed. Thus, should a new database server instance join the cluster depicted in FIG. 1, the new database server instance will be able to use the control file 101 to determine the current move status of data file 102. The specifics of the aforementioned feature and other uses of the control file 101 will be described in more detail in later sections.

In an embodiment, move process 107 starts by default in normal state 200, the state indicating that data file 102 is not currently being moved to a new location. The control file 101 also, by default, reflects the normal state 200 for data file 102. While in the normal state 200 and in response to a determination that data file 102 should be moved to a new location, move process 107 performs transition 205 into copying state 201. In one embodiment, move process 107 determines that data file 102 should be moved to a new location in response to database server instance 104 receiving a manual user command. For example, the user command may reference data file 102 and specify the new location where data file 102 should be moved. In another embodiment, database server instance 104 automatically determines to move data file 102 to the new location. For example, database server instance 104 may maintain statistics indicating how often data file 102 is accessed. Then, once the access frequency has dropped below a particular threshold, database server instance 104 determines to move data file 102 to a new location that represents archival storage.

During transition 205, move process 107 updates the control file to indicate the copying state 201. In addition, move process 107 communicates to the database server instances 104, 105, 106 of the cluster an indication that the move process 107 has transitioned into the copying state 201 and an initial copy range into data file 102 (the range of data blocks currently being copied to the new location). In an embodiment, move process 107 communicates the aforementioned information to database server instances 104, 105, 106 through an inter-process communication mechanism, such as a file in shared memory, a pipe, a network socket, a message queue, etc. For example, each database server instance 104, 105, 106 may execute one or more processes responsible for collecting and/or processing messages related to move status updates. Thus, although move process 107 executes within database server instance 104, move process 107 in some embodiments still communicates move status updates to the appropriate process within database server 104. However, in other embodiments, move process 107 may directly process move status updates on behalf of database server instance 104 and thus only communicates move status updates to the other database server instances 105, 106 of the cluster. In some embodiments, move process 107 sets the initial copy range to (0,0) by default. However, in other embodiments, move process 107 may set the initial copy range to the first set of blocks that will be copied to the new location. In such an embodiment, move process 107 may also copy the blocks of data file 102 that are within the initial copy range to the new location during transition 205.

In an embodiment, when move process 107 is in copying state 201, the state indicating that the blocks of data file 102 are currently being copied to the new location, transitions 206, 207, and 210 are available.

In response to a determination that copying data file 102 to the new location is not complete, move process 107 performs transition 206 back into copying state 201. In an embodiment, move process 107 performs the aforementioned determination by comparing the current copy range to the size (in blocks) of data file 102. Should the upper-value of the copy range fall short of the size of the data file 102, move process 107 determines that copying is not complete.

During transition 206, move process 107 advances the copy range and communicates the new copy range to database server instances 104, 105, 106. In addition, move process 107 copies the data blocks of data file 102 that are within the new copy range to the new location. Transition 206 may be repeated any number of times depending on the size of data file 102 and how far the copy range is advanced during transition 206. In some embodiments, the copy range may be advanced a set amount of blocks each time transition 206 is traversed by move process 107. However, in other embodiments, the copy range may be advanced by a variable amount of blocks during each transition 206.

In response to a determination that copying data file 102 to the new location has been successfully completed, move process 107 performs transition 207 to success state 202. In an embodiment, move process 107 performs the aforementioned determination by comparing the current copy range to the size (in blocks) of data file 102. Should the upper-value of the copy range match the size of data file 102, move process 107 determines that all the blocks of data file 102 have been successfully copied to the new location. During transition 207, move process 107 updates the control file to indicate the success state 202, communicates the success state 202 to the database server instances 104, 105, 106, and commits the move.

In response to a determination that copying data file 102 to the new location has failed, move process 107 performs transition 210 into failure state 204. In one embodiment, move process 107 determines that copying data file 102 to the new location has failed when the data file 102 at the old location becomes unavailable before copying is complete. As one example, database server instances 104, 105, 106 may receive a user command that brings the data file 102 at the old location offline. As another example, IO processes 108, 109 may take the data file 102 at the old location offline in response to receiving an error when performing a read or write on the data file 102 at the old location in accordance with a database policy.

During transition 210, move process 107 updates the control file 101 to indicate failure state 204, communicates failure state 204 to the database server instances 104, 105, 106, and deletes the data file 102 at the new location.

In some cases, IO processes 108, 109 may extend data file 102 by adding blocks while move process 107 is in the copying state 201. Thus, the amount of blocks to be copied over from the old location to the new location may change after move process 107's transition 205 into copying state 201. As a result, some embodiments may check the current size of data file 102 before performing the determination(s) that represent the conditions 300 to follow transitions 206, 207. Then, should move process 107 discover that data file 102 has been extended, the updated data file size is used for the aforementioned determinations.

When move process 107 is in success state 202, the state indicating that data file 102 has been successfully copied to the new location, transition 208 is available into done state 203. Move process 107 follows transition 208 in response to a determination that the success state 202 has been communicated to the database server instances 104, 105, 106. Thus, while the success state 202 indicates that the blocks of data file 102 have been successfully moved to the new location, the done state 203 indicates that all database server instances 104, 105, 106 of the cluster are aware of the successful copying. In an embodiment, move process 107 determines that the success state 202 has been communicated as a result of the actions 301 performed during transition 207. Specifically, after the move process has finished communicating the success state 202 to the database server instances 104, 105, 106.

During transition 208, move process 107 updates the control file 101 to the done state 203, communicates the done state 203 to database server instances 104, 105, 106, and performs cleanup operations related to the move of data file 102. For example, in some cases move process 107 may delete the data file 102 at the old location to complete the move. In other cases, move process 107 may leave the data file 102 at the old location intact but make the data file 102 at the old location inactive. For example, the data file 102 at the old location may be retained as a backup in case the data file 102 at the new location is lost. In both cases, the move process 107 updates the control file 101 to indicate that the current location of data file 102 is the new location. In an embodiment, move process 107 determines whether or not to delete the data file 102 at the old location based on the circumstances that caused transition 205. For example, in the case of a user command, the user command may specify whether the data file 102 at the old location is to be retained after the move.

When move process 107 is in the done state 203, the state indicating that the successful copying of data file 102 has been communicated to all database server instances 104, 105, 106 of the cluster, transition 209 is available back into the normal state 200. Move process 107 follows transition 209 in response to a determination that the cleanup operations have been completed. In an embodiment, move process 107 determines that the cleanup operations are completed as a result of performing the actions 301 of transition 208. During transition 209 the move process 107 updates the control file 101 back to the normal state 200, indicating that the move of data file 102 has completed and the data file 102 is no longer in the process of being moved.

When move process 107 is in failure state 204, the state indicating that copying the blocks of data file 102 to the new location has failed, transition 211 is available back into the normal state 200. Move process 107 follows transition 211 in response to a determination that the data file 102 at the new location has been deleted and failure state 204 has been communicated to all database server instances 104, 105, 106 of the cluster. Thus, in an embodiment, move process 107 determines that the data file 102 at the new location has been deleted and the failure state 204 has been communicated to database server instances 104, 105, 106 as a result of performing the actions 301 of transition 210. During transition 211, move process 107 updates the control file 101 back to the normal state 200, indicating that the move of data file 102 has completed. In some embodiments, move process 107 may automatically restart the move after a failure. For example, in response to following transition 211, move process 107 may determine that the data file 102 is to be moved to the new location and thus will automatically follow transition 205. As a result, should the move fail, the move process 107 attempts the move again until the move is successfully performed. However, some embodiments may limit the number of failed attempts to a specified threshold before abandoning the move entirely. In some embodiments, in cases where the transition 210 into the failure state 204 was caused by the data file 102 at the old location being brought offline, the move process 107 automatically restarts the move in response to detecting that the data file 102 at the old location has been brought back online.

4.0 Database Server Instance Flow

For the sake of brevity, the examples provided in the sections will be described primarily from the perspective of database server instance 105. However, the techniques described in reference to database server instance 105 are also applicable to the other database server instances of the cluster as well, including database server instances 104, 106.

Figure 4:
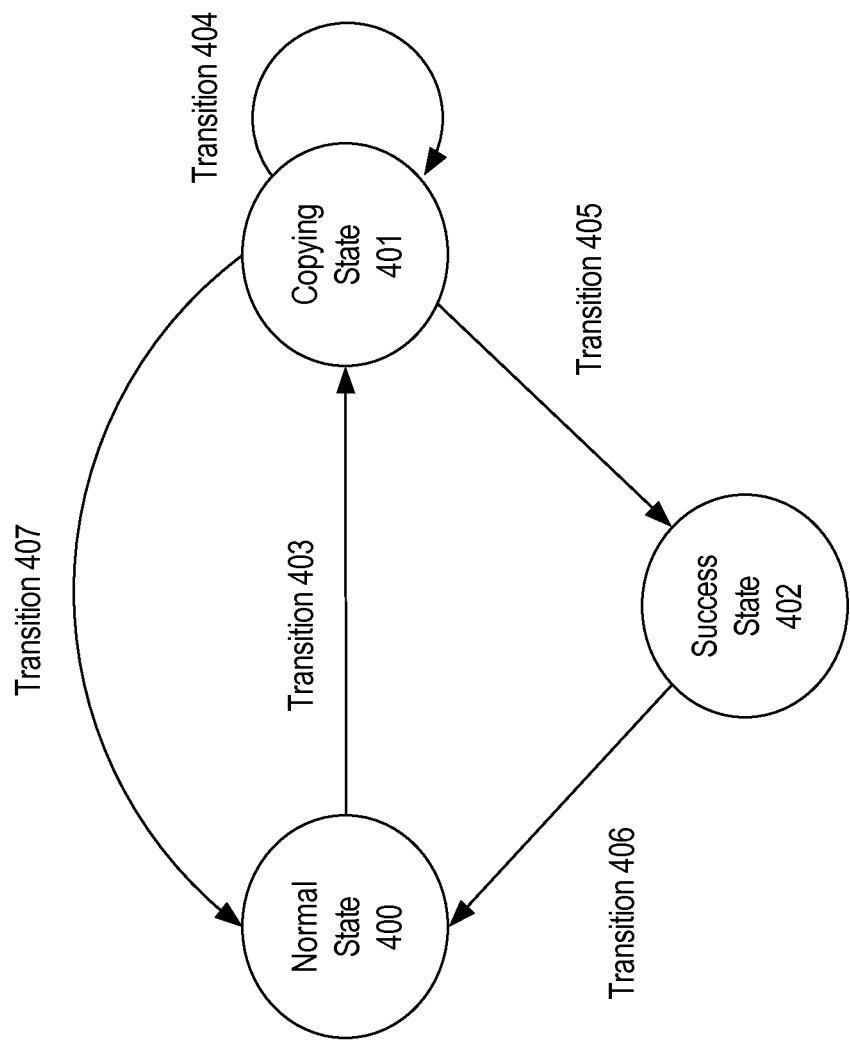
FIG. 4 is a state diagram illustrating the flow of a database server instance according to an embodiment of the present invention.

FIG. 4 illustrates a state diagram for database server instance 105 according to an embodiment of the present invention. The exact process or processes executing within database server instance 105 that performs the flow depicted by FIG. 4 is not critical to the techniques described herein. As a result, the flow may be performed by IO process 108 or any number of other processes executing within database server instance 105.

In some embodiments, move process 107 may transfer more than one file at a time and the move for each file may be performed asynchronously. As a result, database server instance 105 may follow the state diagram of FIG. 4 separately for each file being transferred. FIG. 5 illustrates a table that describes the conditions 500 and actions 501 associated with each of the transitions of FIG. 5. Since FIG. 4 is a representative example of the flow of database server instance 105 according to one embodiment, the order that the actions 501 are listed in FIG. 5 is not dispositive. In some embodiments, the actions 501 may be performed in a different order. In addition, depending on the embodiment, the performance of the actions 501 may take place before the transition, during the transition, or after the transition. Furthermore, some embodiments may include less states or more states than is depicted in FIG. 4 and the actions 501 performed during the corresponding transitions may be condensed or expanded across a fewer or greater number of transitions (potentially with one or more new actions being added and/or one or more depicted actions being omitted).

Furthermore, while the control file 101 maintains the move status for data file 102 from the perspective of the move process 107, it is assumed that database server instance 105 maintains a local move status within local memory 111 that is accessible to the processes executing within database server instance 105, including IO process 108. As will be described in more detail below, when an process executing within database server instance 105, such as IO process 108, performs a read or write to data file 102, the performance of that read or write depends upon the local move status and other variables stored within the local memory 111 of the corresponding database server instance 105.

In an embodiment, database server instance 105 starts by default in normal state 400, indicating that data file 102 is not currently in the process of being moved to a new location. In addition, local memory 111 is set by default to store an indication of the normal state 400 for data file 102. In response to receiving an indication that move process 107 has entered the copying state 201 and an initial copy range, database server instance 105 follows transition 403 to copying state 401. During transition 403, database server instance 105 updates the local move status to indicate copying state 401 and stores the initial copy range in local memory 111.

In an embodiment, when database server instance 105 is in the copying state 401, the state indicating that data file 102 is currently being copied to the new location, transitions 404, 405, and 407 are available.

In response to receiving a new copy range from move process 107, database server instance 105 follows transition 404 back into copying state 401. During transition 404, database server instance 105 updates the copy range stored in local memory 111 to the new copy range received from move process 107.

In response to receiving an indication that the move process 107 has entered success state 202, database server instance 105 follows transition 405 to success state 402. During transition 405, database server instance 105 updates the local move status in local memory 111 to indicate success state 402.

In response to receiving an indication that the move process 107 has entered failure state 204, database server instance 105 follows transition 407 to normal state 400. During transition 407, database server instance 105 updates the local move status in local memory 111 to indicate normal state 400.

In an embodiment, when database server instance 105 is in the success state 402, the state indicating that data file 102 has been successfully copied to the new location, transition 406 is available. In response to receiving an indication that the move process 107 has entered the done state 203, database server instance 105 follows transition 406. During transition 406, database server instance 105 updates the local move status in local memory 111 to indicate the normal state 400.

5.0 IO Processes

For the following explanations it will be assumed that IO process 108 performs IO operations (reads and/or writes) on data file 102. Thus, although the examples provided in this section will be described primarily in reference to IO process 108, the same techniques are also applicable to IO process 109 as well as other processes on database server instances 104, 105, 106 that perform reads and writes on database 100. As previously defined, the pre-move and post-move location of data file 102 will be referred to as the "old" and "new" locations respectively.

In an embodiment, IO process 108 performs IO operations (reads and writes) to data file 102 at the old location or the new location based on the local move status and the copy range stored within the local memory 111 of the corresponding database server instance 105. For the purpose of this section the "primary" file is defined to be the data file 102 at the old location before the database server instance 105 enters the success state 202 and the data file 102 at the new location after the database server instance 105 enters the success state 202. Thus, after each move cycle (traversal through FIG. 4 and back to the normal state 400), the "primary" file becomes the data file 102 at the new location if the move was successful and remains the data file 102 at the old location if the move failed. Furthermore, after a successful move cycle, the "old" location for the current cycle will, as a result, become the "new" location of the previous cycle.

For the following explanations, when a read or write is "reissued" by IO process 108, the local move status and copy range stored within local memory 111 as of the time the IO operation was originally issued is discarded and the current local move status and copy range stored within local memory 111 are used instead during the performance of the IO operation.

In an embodiment, IO process 108 performs read operations on the primary file.

In an embodiment, when IO process 108 writes to data file 102 while local memory 111 indicates the normal state 400, the write is performed on the primary file. When the IO process 108 writes to data file 102 while local memory 111 indicates the copying state 401, the performance of the write depends on the current copy range stored within local memory 111. If the write is to a block of data file 102 that is below the copy range (blocks have already been copied), the write is performed on both the primary file and the secondary file. If the write is to a block of data file 102 that is within the copy range (blocks are currently being copied), IO process 108 waits until the copy range has advanced beyond the block before issuing the write. If the write is to a block of data file 102 that is above the copy range (blocks have not yet been copied), IO process 108 performs the write on the primary file. When IO process 108 writes to data file 102 while local memory 111 indicates the success state 402, the write is performed on both the primary and secondary files.

In some embodiments, move process 107 continues to move data file 102 concurrently with the IO process 108 performing IO operations. As a result, the local move status indicated by local memory 111 for data file 102 may change between the time an IO operation begins and the time that the IO operation completes. In some cases, this may require reissuing the IO operation to ensure that the IO operation is performed to the correct location(s). In some embodiments, in order to detect that an IO operation is being performed at an incorrect location, database server instance 105 maintains sequence numbers in local memory 111. In one embodiment, database server instance 105 maintains three sequence numbers, a read sequence number that is incremented during transitions 405 and 406, a primary write sequence number that is incremented during transition 405, and a duplicate write sequence number that is incremented during transition 403.

One purpose of the sequence numbers is to assist the IO process 108 in differentiating between different move cycles. For example, while local memory 111 indicates the normal state 400, IO process 108 may issue a write to data file 102 at the old location. Before the IO operation completes, the move process 107 moves the data file 102 to a new location and returns to the normal state 200. Consequently, the move process 107, by this point, has caused the database server instance 105 to cycle through FIG. 4. Without sequence numbers or another similar mechanism, IO process 108 is unable to determine that the data file 102 has been moved simply by inspecting the local move status within local memory 111. As a result, the IO process 108 would not recognize that the IO operation should be reissued. Therefore, the local move status is used by the IO process 108 to distinguish between the states within a particular cycle and the sequence numbers are used to distinguish between different cycles.

In an embodiment, prior to performing an IO operation, IO process 108 saves one of the three sequence numbers, depending on the operation performed, and compares the saved sequence number to the current sequence number after the IO operation has completed. A read operation is reissued if the read sequence number has changed by two or more. A write operation that was issued only to the primary file is reissued if the primary write sequence number has changed by one or more or if the local move status/copy range currently indicates that the write should be performed to both the primary and secondary files. A write operation that has been issued to both the primary and secondary file is reissued if the duplicate write sequence number has changed by one or more.

6.0 New Database Server Instance Joining the Cluster

In an embodiment, when a new database server instance joins the cluster, the new database server instance reads the control file 101 for data file 102, updates the local move status in its respective local memory, and changes to the corresponding state within FIG. 4. The aforementioned updates will be referred to as updating to a state. For the following example, assume the clustered environment depicted by FIG. 1 originally contains only database server instances 104 and 105. At a later point in time database server instance 106 joins the cluster. If the control file 101 indicates copying state 201, database server instance 106 updates to copying state 401 and sets the copy range to cover all the blocks of data file 102 (effectively blocking writes). Database server instance 106 then waits for an update from move process 107 before setting the correct copy range, thus allowing write operations on data file 102 to resume. If the control file 101 indicates normal state 200, database server instance 106 updates to normal state 400. If the control file 101 indicates success state 202, database server instance 106 updates to success state 402. If the control file 101 indicates done state 203, database server instance 106 updates to normal state 400. If the control file 101 indicates failure state 204, database server instance 106 updates to normal state 400.

7.0 Error Handling

In some cases, the move process 107 may cease to function properly while moving data file 102. For example, the move process 107 may die or the database server instance 104 executing the move process 107 may shut down unexpectedly. In some embodiments, when the move process 107 ceases to function, the other database server instances 105, 106 clean up the move operation. However, assuming the move process 107 ceased to function while database server instance 104 is still operational, database server instance 104 may perform the cleanup instead of or in addition to database server instances 105, 106. In one embodiment, database server instances 105, 106 create a new process that performs the cleanup. However, in other embodiments, database server instances 105, 106 may utilize an existing process, such as IO process 108, 109 to perform the cleanup.

In an embodiment, the process performing the cleanup (cleanup process), inspects the control file 101 to discover the last known state of the move process 107. If the move process 107 ceased to function before entering the success state 202 the cleanup process rolls back the move, otherwise if the move process 107 entered the success state 202 before ceasing to function the cleanup process completes the move. In the former case, the cleanup process propagates the normal state 200 to the remaining database server instances and deletes the data file 102 at the new location. In the latter case, the cleanup process updates to the state in FIG. 2 corresponding to the move status specified by the control file 101 for data file 102 and continues the move operation. In some embodiments, the cleanup process may inspect logs, such as REDO and UNDO logs, to ensure that the actions of the previous transition in FIG. 2 were successfully performed. If not, the cleanup process performs any remaining actions associated with the previous transition.

In some embodiments, the move process 107 may be moving multiple files when an error occurs. Thus, when beginning cleanup, the cleanup process may inspect the move status of all files within the control file 101 in order to determine which files were still in the process of being moved. The cleanup operations as described in this section can then be performed for each of the files for which the control file 101 does not indicate the normal state 200.

In some embodiments, the cleanup is performed in a delayed fashion. For example, the database server instances may wait to clean up the move until a command bringing the data file 102 offline is received. As another example, the database server instances may perform the cleanup at instance startup.

In some cases, processes performing writes on data file 102, such as IO processes 108, 109, may fail after performing only part of the write. For example, IO process 108 may issue a write to the data file 102 at both the old and new locations, but crash after completing the write to only one of the aforementioned locations. In some embodiments, to prevent the data file 102 from being left in an inconsistent state, the database server instances 104, 105, 106 perform recovery operations in response to detecting that a process exited abnormally. However, in some circumstances, the process may have exited abnormally due to the database server instance hosting that process shutting down unexpectedly. As a result, the recovery operations may be performed by the remaining instances of the cluster. In an embodiment, during the recovery operations, database server instances 104, 105, 106 inspect logs associated with the crashed process, such as REDO logs, to determine if a partial write occurred to the data file 102 occurred. If a partial write is detected, the write is reissued to the data file 102 at both the old and new locations.

8.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
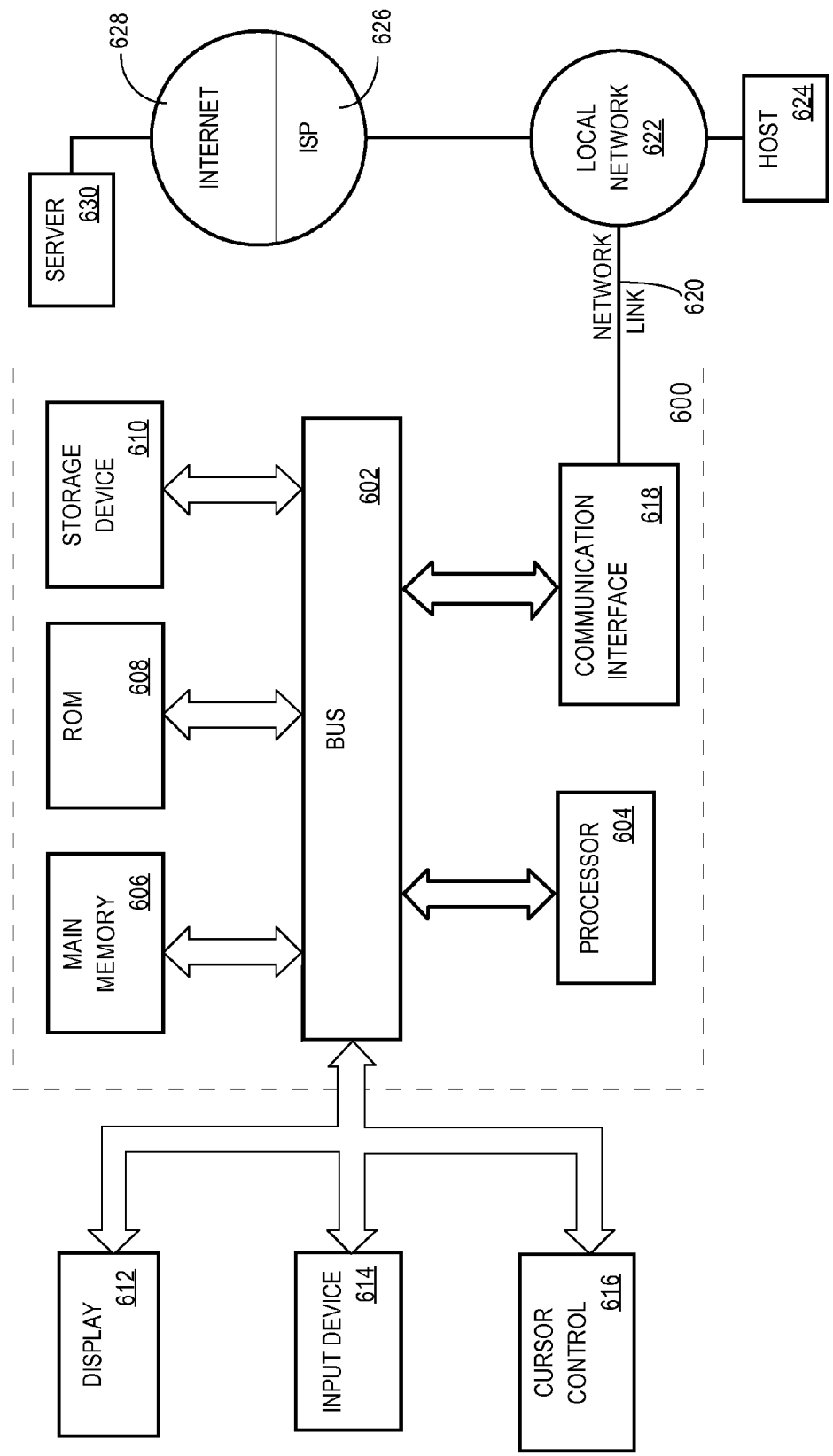
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
a first process moving a database file from a first storage location to a second storage location while the database file is available for write operations by one or more other processes, wherein when the first process completes moving the database file to the second storage location, the database file contains any changes that occurred as a result of the write operations;
wherein the first process moves the database file from the first storage location to the second storage location by dividing the database file into a plurality of ranges and sequentially copying the plurality of ranges to the second storage location,
wherein each range of the plurality of ranges encompasses one or more data blocks of the database file;

while the first process is moving the database file from the first storage location to the second storage location, a particular process of the one or more other processes performing a write operation by determining that the write operation is to a particular range of the plurality of ranges that has already been copied to the second storage location and, in response, performing the write operation to the database file at both the first storage location and the second storage location;

wherein the method is performed by one or more computing devices.

2. The method of claim 1, wherein the first process and the one or more other processes are executing by one or more database server instances.

3. The method of claim 1, wherein the first storage location is on a first storage device and the second storage location is on a second storage device that is different than the first storage device.

4. The method of claim 2, further comprising the first process communicating a status of the move to the one or more database server instances.

5. The method of claim 4, further comprising the first process copying the particular range of the plurality of ranges of the database file from the first storage location to the second storage location and communicating the particular range to the one or more database server instances.

6. The method of claim 2, further comprising the one or more database server instances detecting that the first process has failed and determining whether to complete the move or roll the move back.

7. The method of claim 2, further comprising the first process or a second process executing by the one or more database server instances detecting that a particular process of the one or more other processes failed after performing a partial write to the database file and in response completing the partial write.

8. The method of claim 1, further comprising the one or more other processes performing a read operation or a write operation on the database file and determining whether the read operation or the write operation should be reissued based on a progress of the first process through the move.

9. The method of claim 1 further comprising the first process storing an indication of a progress of the move in a control file.

10. The method of claim 1, further comprising:

while the first process is moving the database file from the first storage location to the second storage location, a second particular process of the one or more other processes performing a second write operation by determining that the second write operation is to a second particular range of the plurality of ranges that has not yet been copied to the second storage location and, in response, performing the second write operation to the database file at the first storage location, but not the second storage location;

while the first process is moving the database file from the first storage location to the second storage location, a third particular process of the one or more other processes performing a third write operation by determining that the third write operation is to a third particular range of the plurality of ranges that is currently being copied by the first process to the second storage location in response, stalling the third write operation and reissuing the third write operation at a later time.

11. A non-transitory computer-readable medium storing one or more instructions which when executed by one or more processors cause the one or more processors to perform:

a first process moving a database file from a first storage location to a second storage location while the database file is available for write operations by one or more other processes, wherein when the first process completes moving the database file to the second storage location, the database file contains any changes that occurred as a result of the write operations;

wherein the first process moves the database file from the first storage location to the second storage location by dividing the database file into a plurality of ranges and sequentially copying the plurality of ranges to the second storage location, wherein each range of the plurality of ranges encompasses one or more data blocks of the database file;

while the first process is moving the database file from the first storage location to the second storage location, a particular process of the one or more other processes performing a write operation by determining that the write operation is to a particular range of the plurality of ranges that has already been copied to the second storage location and, in response, performing the write operation to the database file at both the first storage location and the second storage location.

12. The non-transitory computer-readable medium of claim 11, wherein the first process and the one or more other processes are executing by one or more database server instances.

13. The non-transitory computer-readable medium of claim 11, wherein the first storage location is on a first storage device and the second storage location is on a second storage device that is different than the first storage device.

14. The non-transitory computer-readable medium of claim 12, wherein one or more instructions further cause the one or more processors to perform the first process communicating a status of the move to the one or more database server instances.

15. The non-transitory computer-readable medium of claim 14, wherein the one or more instructions further cause the one or more processors to perform the first process copying the particular range of the plurality of ranges of the database file from the first storage location to the second storage location and communicating the particular range to the one or more database server instances.

16. The non-transitory computer-readable medium of claim 12, wherein the one or more instructions further cause the one or more processors to perform the one or more database server instances detecting that the first process has failed and determining whether to complete the move or roll the move back.

17. The non-transitory computer-readable medium of claim 12, wherein the one or more instructions further cause the one or more processors to perform the first process or a second process executing by the one or more database server instances detecting that a particular process of the one or more other processes failed after performing a partial write to the database file and in response completing the partial write.

18. The non-transitory computer-readable medium of claim 11, wherein the one or more instructions further cause the one or more processors to perform the one or more processes performing a read operation or a write operation on the database file and determining whether the read operation or the write operation should be reissued based on a progress of the first process through the move.

19. The non-transitory computer-readable medium claim 11, wherein the one or more instructions further cause the one or more processors to perform the first process storing a progress of the move in a control file.

20. The non-transitory computer-readable medium of claim 11, wherein the one or more processors further cause the one or more processors to perform:
- while the first process is moving the database file from the first storage location to the second storage location, a second particular process of the one or more other processes performing a second write operation by determining that the second write operation is to a second particular range of the plurality of ranges that has not yet been copied to the second storage location and, in response, performing the second write operation to the database file at the first storage location, but not the second storage location;
- while the first process is moving the database file from the first storage location to the second storage location, a third particular process of the one or more other processes performing a third write operation by determining that the third write operation is to a third particular range of the plurality of ranges that is currently being copied by the first process to the second storage location in response, stalling the third write operation and reissuing the third write operation at a later time.

* * * * *